US007029715B2

(12) United States Patent
McCall et al.

(10) Patent No.: US 7,029,715 B2
(45) **Date of Patent: *Apr. 18, 2006**

(54) METHODS AND SYSTEMS FOR AUTOMATICALLY EXTRUDING AND CUTTING DOUGH-BASED PRODUCTS HAVING PRE-SELECTED WEIGHTS

(75) Inventors: Garcie M. McCall, Germanton, NC (US); Stanley N. Lowry, Kernersville, NC (US); Charles David Crawford, Burlington, NC (US); Joey R. Spruill, Greensboro, NC (US); Robert Simpson, Elon College, NC (US)

(73) Assignee: HDN Development Corporation, Florence, KY (US)

( * ) Notice: Subject to any disclaimer, the term of this patent is extended or adjusted under 35 U.S.C. 154(b) by 174 days.

This patent is subject to a terminal disclaimer.

(21) Appl. No.: 10/351,820

(22) Filed: Jan. 27, 2003

(65) Prior Publication Data

US 2004/0005396 A1 Jan. 8, 2004

Related U.S. Application Data

(63) Continuation-in-part of application No. 09/864,701, filed on May 23, 2001, now Pat. No. 6,511,689.

(60) Provisional application No. 60/238,511, filed on Oct. 6, 2000, provisional application No. 60/238,477, filed on Oct. 6, 2000, provisional application No. 60/206,918, filed on May 25, 2000.

(51) Int. Cl.

| | |
|---|---|
| ***A21C 11/00*** | (2006.01) |
| ***A21D 8/00*** | (2006.01) |
| ***G01N 33/00*** | (2006.01) |

(52) U.S. Cl. ...................... 426/231; 425/140; 425/145; 426/439; 426/496; 426/516

(58) Field of Classification Search ................ 426/231, 426/496, 516, 439, 302; 425/140, 145
See application file for complete search history.

(56) References Cited

U.S. PATENT DOCUMENTS

| | | | |
|---|---|---|---|
| 3,499,395 | A | 3/1970 | Kaufman, Jr. et al. |
| 4,834,996 | A | 5/1989 | Fazzolare et al. |
| 4,979,434 | A | 12/1990 | van Lengerich |
| 5,073,391 | A | 12/1991 | DeMars et al. |
| 5,209,939 | A | 5/1993 | Kempf |
| 5,417,992 | A | 5/1995 | Rizvi et al. |
| 5,614,227 | A | 3/1997 | Yarbrough |
| 5,731,022 | A | 3/1998 | Cummins |
| RE36,147 | E | 3/1999 | Backus et al. |

FOREIGN PATENT DOCUMENTS

| | | |
|---|---|---|
| DE | 19820709 A1 | 11/1998 |

OTHER PUBLICATIONS

PCT/US01/16882 International Search Report, mailed Sep. 25, 2001.

*Primary Examiner*—George C. Yeung
(74) *Attorney, Agent, or Firm*—Kilpatrick Stockton LLP

(57) ABSTRACT

A method for automatically forming dough-based products, such as doughnuts involves pressurizing a tank containing dough. The dough is extruded to form a flight of dough-based products. The weight of the flight of dough-based products is measured. The weight data is transmitted to a computer. The measured weight is compared to a predetermined weight stored in the computer memory. The pressure in the tank is adjusted automatically before subsequent extrusions.

32 Claims, 10 Drawing Sheets

A Tank Containing Dough Is Pressurized. — 1
The Dough Is Extruded Into At Least One Dough-based Product. — 2
The Weight Of The At Least One Dough-Based Product Is Measured. — 3
The Weight Data Are Transmitted To A Computer Having A Processor And Memory — 4
The Weight Data Of The At Least One Dough-Based Product Are Compared To A Predetermined Weight Stored In the Computer Memory. — 5
The Pressure In the Tank Is Adjusted Based On The Weight Comparison Before Subsequent Extrusions. — 6
The Dough-Based Products Are Proofed. — 7
The Dough-Based Products Are Fried. — 8
The Dough-Based Products Are Glazed. — 9

METHODS AND SYSTEMS FOR AUTOMATICALLY EXTRUDING AND CUTTING DOUGH-BASED PRODUCTS HAVING PRE-SELECTED WEIGHTS

CROSS-REFERENCE TO RELATED APPLICATIONS

This is a continuation-in-part application of pending U.S. patent application Ser. No. 09/864,701 filed on May 23, 2001, now U.S. Pat. No. 6,511,689 which is incorporated in full by reference, which claims priority to, and incorporates by reference in full, the following provisional applications: U.S. Provisional Patent Application Ser. No. 60/238,511, filed Oct. 6, 2000, entitled "Methods and Systems to Automatically Control Extruded Dough-Based Product Weight;" U.S. Provisional Patent Application Ser. No. 60/238,477, filed Oct. 6, 2000, entitled "Methods and Systems for Automatically Extruding and Cutting Dough-Based Products Having Pre-Selected Weights;" and U.S. Provisional Patent Application Ser. No. 60/206,918 filed May 25, 2000, entitled, "Methods and Apparatus for Automatically Extruding and Cutting Dough-Like Products Having Pre-selected Weights."

FIELD OF THE INVENTION

The present invention relates generally to methods and systems for automatically extruding dough-based products having pre-selected weights. More particularly, embodiments of the present invention automatically scale the weight of a dough-based product, such as a doughnut, at the extruder end of an apparatus by controlling the extrusion tank air pressure.

BACKGROUND OF THE INVENTION

Doughnut production involves mixing and extruding a dough-based product. The extruded dough-based product is cut and dropped onto a belt or tray and transported through a proofer to a frying apparatus for cooking. After cooking, the dough-based product may be glazed, filled, and/or decorated to make the final doughnut.

A conventional extruding and cutting apparatus is made of stainless steel plate, industrial construction, and washdown (NEMA IV is a requirement). Such an extruding and cutting apparatus comprises a container for the dough, a lid with hold-down screws, and an extruding mechanism that dispenses the dough-based products at the base of the container. As used herein, the term "extruding mechanism" includes what is known in the industry as "cutters," "knives," or any other extruding device that is used to extrude and cut the dough-based product from the container.

A conventional extruding and cutting apparatus is constructed somewhat like a pressure cooker, and the container is airtight when the screws are tightened and the lid is secured. Once secured, the container is pressurized to a pre-selected starting air pressure that is based on the type of dough-based product to be dispensed. Air pressure is critical to the maintenance of proper dispensed weight of the selected dough-based product. Next, the extrusion process is initiated and air pressure forces the dough through the cutters as they are opened and closed by the air cylinder mechanism.

It is important that dough-based products formed by the extruder have a constant weight (i.e., a weight within an acceptable range). Operating conditions for subsequent processing steps are set based on dough-based products having a particular weight. When dough-based products are formed by the extruder and have weights outside of a target range, then the final product (i.e., after proofing and frying) may have undesirable properties. For example, the dough-based products may be outside product specifications, crunchy, too oily, underfried or may have a burnt flavor. Dough-based products with these properties may be unsatisfactory to customers.

In conventional systems, an operator constantly oversees the production run and manually weighs the dispensed dough-based products (i.e., individual cuttings of the dough-based product). Based on the actual dispensed weight, the operator adjusts air pressure to maintain the pre-selected weight of the dough-based products. If a dough-based product is not within the pre-selected dough-based product weight range, then the operator manually, adjusts the air pressure until the pre-selected dough-based product weight range is achieved.

For example, in a conventional system designed to produce two hundred seventy (270) dozen doughnuts per hour, an operator removes one half dozen doughnuts per minute (i.e., one tray or flight of doughnuts—six doughnuts being the number of doughnuts formed with each extrusion) and weighs them. The operator then adjusts the pressure if the weight of these six doughnuts are outside of a target weight range. With this system, thirty dozen doughnuts are discarded per hour in order to insure that doughnuts having a proper weight are formed by the extruder. In addition, the operator may also spend time straightening the formed dough-based products on the trays before they are proofed.

Further, in conventional processes, when the dough supply runs low, one or more of the cutters dispense air. This is referred to as a "blow out." Thereafter, the operator immediately stops the extrusion process.

Conventional industry practice is a time-consuming, subjective, and imprecise process that demands high labor and product resources. Thus, a need exists for methods and systems to automatically extrude and cut dough-based products while also automatically maintaining a pre-selected target weight. A need also exists for methods and systems that are able to communicate with other doughnut production devices, such as a proofer or a fryer, and automatically control these devices with input/output signals to streamline the entire doughnut production process. There is a further need for state-of-the-art methods and systems that are user-friendly and that are able to collect, accumulate, disseminate, and manage doughnut production data in a fast, reliable, and efficient manner.

SUMMARY

To overcome the aforementioned problems and to provide other benefits, the present invention provides easy, reliable, and efficient methods and systems for automatically extruding and cutting dough-based products having pre-selected weights. In an embodiment of the present invention, the methods and systems automatically scale the weight of individually cut dough-based products dispensed at the extruder end of an extruder apparatus by directly controlling the extrusion tank air pressure, thereby, controlling the dough-based product weight range. Examples of dough-based products that may be formed using the methods and apparatuses of the present invention include, without limitation, doughnuts, ring doughnuts, doughnut shells, doughnut holes, doughnut twists and cinnamon rolls.

In an embodiment of a method of the present invention for automatically forming dough-based products, a tank containing dough is pressurized. The dough is extruded and cut into individual dough-based products by an extruding mechanism. In one embodiment, several extruding mechanisms are connected to the tank, such that an equivalent number of dough-based products may be formed at the same time. The extruding mechanisms may be actuated at the same time, so that in one cycle, a flight of individual dough-based products are formed and may be released onto trays or other conveying mechanisms.

According to a method of the present invention, the weight of the dough-based products in each flight is measured. The weight of the dough-based products in each flight may be measured in a number of ways. In one embodiment, the weight of the tank, including its contents, is measured after each flight of dough-based products is formed. The weight of the tank after the flight of dough-based products is formed is compared to the weight of the tank after the formation of the previous flight to determine the weight of the most recently formed flight of dough-based products. In this embodiment, the tank is attached to at least one load cell that measures the weight of the tank and its contents.

The weight data from the load cells may be transmitted to a computer having a processor and memory. The measured weight of the dough-based products in the flight is compared to a predetermined weight stored in the computer memory. If the measured weight is different from the predetermined weight, the computer may adjust the pressure in the tank. The computer may adjust the pressure in the tank by transmitting a signal to an air pressure controller coupled to a source of air pressure. A software application may perform this comparison and determine the size of the pressure adjustment. If the measured weight is the same as the predetermined weight, no pressure adjustment may be necessary.

In another embodiment, a predetermined weight range is stored in the computer memory. In this embodiment, if the measured weight is outside the predetermined weight range, then the computer may adjust the pressure in the tank. If the measured weight is within the predetermined weight range, then no pressure adjustment may be necessary.

The computer may also include a database, which stores dough-based product formulas. The product formulas may be sorted by type of dough-based product and may include such information as the predetermined weight, the number of extruding mechanisms and an initial air pressure for the tank.

In another embodiment of a method of the present invention, data relating to the measured weight of the dough-based products and pressure adjustment are stored. The stored data may be used in subsequent processing steps. For example, the stored data may be used to adjust the process parameters of a proofer or a fryer.

In another embodiment, a method for automatically forming dough-based products comprises adding dough to a tank having a lid and securing the lid to the tank. The lid may be secured to the tank manually or using an automated tank tightener. The tank may then be pressurized. The dough is extruded and cut into individual dough-based products by an extruding mechanism. In one embodiment, several extruding mechanisms are connected to the tank, such that an equivalent number of dough-based products may be formed at the same time. The extruding mechanisms may be actuated at the same time, so that in one cycle, a flight of individual dough-based products may be extruded onto trays or other conveying mechanisms.

According to a method of the present invention, the weight of the dough-based products in each flight is measured. The weight of the dough-based products in each flight may be measured in a number of ways. The weight of the at least one dough-based product may be compared to a predetermined weight stored in a computer memory. The pressure in the tank may be adjusted based on the weight comparison.

Methods of the present invention may also comprise specifying at least one process parameter using an input device connected to the computer. In one embodiment, a number of trays to skip after each extrusion may be specified. For example, a user may specify that dough is to be extruded on every other tray.

In further embodiments, the method may comprise entering a user identification means in the computer. The user identification means may be displayed and may be stored along with data relating to measured weights of the dough-based products and pressure adjustments. The user identification means may be required to select dough-based product formulas from a database and/or to modify parameters.

The present invention also relates to methods for automatically making dough-based products. In one embodiment, dough-based products are made by pressurizing a tank containing dough, extruding the dough into individual dough-based products, proofing the dough-based products and frying the dough-based products. In this embodiment, after each extrusion of individual dough-based products, the weight of the dough-based products are measured as discussed above. The weight data may be transmitted to a computer having a processor and memory. The measured weight of the dough-based products may be compared to a predetermined weight stored in the computer memory. Based on this weight comparison, the computer may adjust the pressure in the tank before subsequent extrusions and cuts of dough to form dough-based products. In a further embodiment, the dough-based products are glazed.

A software application on a computer in an embodiment compares the measured weight of the at least one dough-based product to the predetermined weight. The software application may also determine the necessary adjustment, if required, based on the weight comparison. The computer may also include a database containing dough-based product formulas. The product formulas may be sorted by type of dough-based product and may include such information as the predetermined weight, the number of extruding mechanisms and an initial air pressure for the tank.

In another embodiment, data relating to the measured weight of the dough-based products and pressure adjustment are stored. The stored data may be used to adjust process parameters of the proofer, the fryer, the glazer or other post-extrusion processing equipment.

An embodiment of an apparatus of the present invention for automatically forming dough-based products comprises an extruder tank having an air inlet. A source of air pressure is connected to the air inlet to control the pressure in the tank. The apparatus also includes at least one extruding mechanism, which may be a cutter, a knife or other extruding device known in the industry that may be used for extruding and cutting dough-based products. In one embodiment, the extruding mechanism extrudes individual dough-based products. An apparatus of the present invention may be equipped with multiple extruding mechanisms, such that several individual dough-based products may be extruded and cut at the same time.

The extruder tank is positioned on at least one load cell. The load cells are coupled with a computer having a processor and memory. Data relating to the weight of the extruder tank, including its contents, are transmitted from the load cells to the computer. An air pressure controller is coupled with the computer and with the source of air pressure. After receiving the data relating to the weight of the extruder tank, the computer transmits signals to the air pressure controller to adjust the pressure in the tank based on the weight data.

In one embodiment, a database is stored in the memory and includes data relating to type of dough-based product, target weight of the dough-based product, number of extruding mechanisms and initial air pressure in the extruder tank. A user interface device may also be coupled to the computer. The user interface device enables a user to display, select and input process parameters and operating conditions.

In another embodiment, an apparatus of the present invention for automatically forming dough-based products comprises an extruder tank comprising a lid and an air inlet, and containing dough. The apparatus may also comprise means for securing the lid to the extruder tank. In one embodiment, the means for securing the lid to the extruder tank comprises an automated lid tightener. A source of air pressure is connected to the air inlet to control the pressure in the tank. The apparatus also includes at least one extruding mechanism, which may be a cutter, a knife or other extruding device known in the industry that may be used for extruding and cutting dough-based products. In one embodiment, the extruding mechanism extrudes individual dough-based products. An apparatus of the present invention may be equipped with multiple extruding mechanisms, such that several individual dough-based products may be extruded and cut at the same time.

The extruder tank is positioned on at least one load cell. The load cells are coupled with a computer having a processor and memory. Data relating to the weight of the extruder tank, including its contents, are transmitted from the load cells to the computer. An air pressure controller is coupled with the computer and with the source of air pressure. The air pressure controller, in one embodiment, may be a transducer. After receiving the data relating to the weight of the extruder tank, the computer transmits signals to the air pressure controller to adjust the pressure in the tank based on the weight data.

In one embodiment, a database is stored in the memory and includes data relating to type of dough-based product, target weight of the dough-based product, number of extruding mechanisms and initial air pressure in the extruder tank. A user interface device may also be coupled to the computer. The user interface device enables a user to display, select and input process parameters and operating conditions.

A default setting, in another embodiment, may be stored in the memory and may comprise data relating to global parameters and data relating to product formulas. The memory may further include a program to restore the default setting.

The apparatus may also comprise a thermometer. The thermometer may measure, for example, the dough temperature.

It is a feature and advantage of the present invention to provide a method and apparatus for forming dough-based products that provide for the automatic control of the weight of dough-based products.

It is another feature and advantage of the present invention to provide a method and apparatus for forming dough-based products that require less supervision by an extruder operator.

A further feature and advantage of the present invention is to provide a method and apparatus for forming dough-based products that result in substantial product savings by reducing the amount of dough that is discarded in order to monitor the weight of the dough-based products.

A still further feature and advantage of the present invention is to provide a method and apparatus for forming dough-based products that result in standardized dough-based products among various stores (i.e., a ring doughnut made in one store is identical in weight, shape, and appearance as a ring doughnut made in another store).

An additional feature and advantage of the present invention is to provide a method and apparatus for forming dough-based products that automate production line processes and controlling devices using input/output signals from multiple indicators to streamline dough-based production from an extruding apparatus to a proofer apparatus to a fryer apparatus.

A further feature and advantage of the present invention is to provide a method and apparatus for forming dough-based products that include the automated collection of production data.

A still further feature and advantage of the present invention is to provide a method and apparatus for forming dough-based products that enable the tracking of ingredients used to make dough-based products and the automation of re-ordering the ingredients.

The method and apparatus of the present invention also advantageously provide for automated shut-down when there is a production limitation or problem (e.g., blow out when dough supply is low).

Another feature and advantage of the present invention is to provide a method and apparatus for forming dough-based products that include audible alarms to alert an operator, including low product and safety alarms.

A further feature and advantage of the present invention is to provide a method and apparatus for forming dough-based products that allow for increased production flexibility (i.e., the methods and systems can be used for a multitude of dough-based products including doughnuts, such as, for example, ring doughnuts, shell doughnuts, cinnamon buns, doughnut holes, etc.).

A still further feature is that the methods and apparatuses of the present invention may determine the proper operating pressure at the beginning of a production run more quickly than an operator adjusting the pressure by hand.

Another feature and advantage of the present invention is to provide a method and apparatus for forming dough-based products that allow for more precise pressure adjustments.

A further feature and advantage of the present invention is to provide a method and apparatus for forming dough-based products that include means for securing an extruder tank lid to the extruder tank.

A still further feature and advantage of the present invention is to provide a method and apparatus for forming dough-based products that include the ability to measure the temperature of dough in an extruder tank and to make adjustments to the process or process equipment based on the dough temperature.

Another feature and advantage of the present invention is to provide a method and apparatus for forming dough-based products that improves production efficiency by allowing the number of dough-based products produced during a given time period to be controlled based on customer demand.

Additional uses, objects, advantages, and novel features of the invention will be set forth upon review of the drawings and of the detailed description that follows, and will become more apparent to those skilled in the art upon examination of the following.

DETAILED DESCRIPTION

The present invention relates to methods and systems for automatically extruding and cutting dough-based products having pre-selected weights. Examples of dough-based products that may be formed using the methods and apparatuses of the present invention include, without limitation, doughnuts, ring doughnuts, doughnut shells, doughnut holes, doughnut twists and cinnamon rolls.

Embodiments of the present invention provide easy, reliable, and efficient methods and systems for automatically scaling the weight of a dough-based product at an extruder end of an extruder apparatus based on pre-selected dough-based product target (predetermined) weights. In an embodiment of the present invention, the methods and systems control dough-based product weights by transmitting data relating to the weight of the dough-based products to a computer that compares the weight data to a predetermined (e.g., desirable) weight and adjusts the extrusion tank air pressure. Other embodiments enable input/output signals to communicate and manage other production processes and devices.

For example, the weight of the dough-based products is measured and compared to a predetermined weight (e.g., a target weight) of the dough-based products. If the measured or actual weight is greater than the predetermined weight, then the computer may reduce the extrusion tank air pressure (i.e., by reducing the air pressure, a smaller amount of dough is extruded from the extrusion tank). If the measured or actual weight is less than the predetermined weight, then the computer may increase the extrusion tank air pressure, which increases the amount of dough extruded from the extrusion tank.

Figure 1:
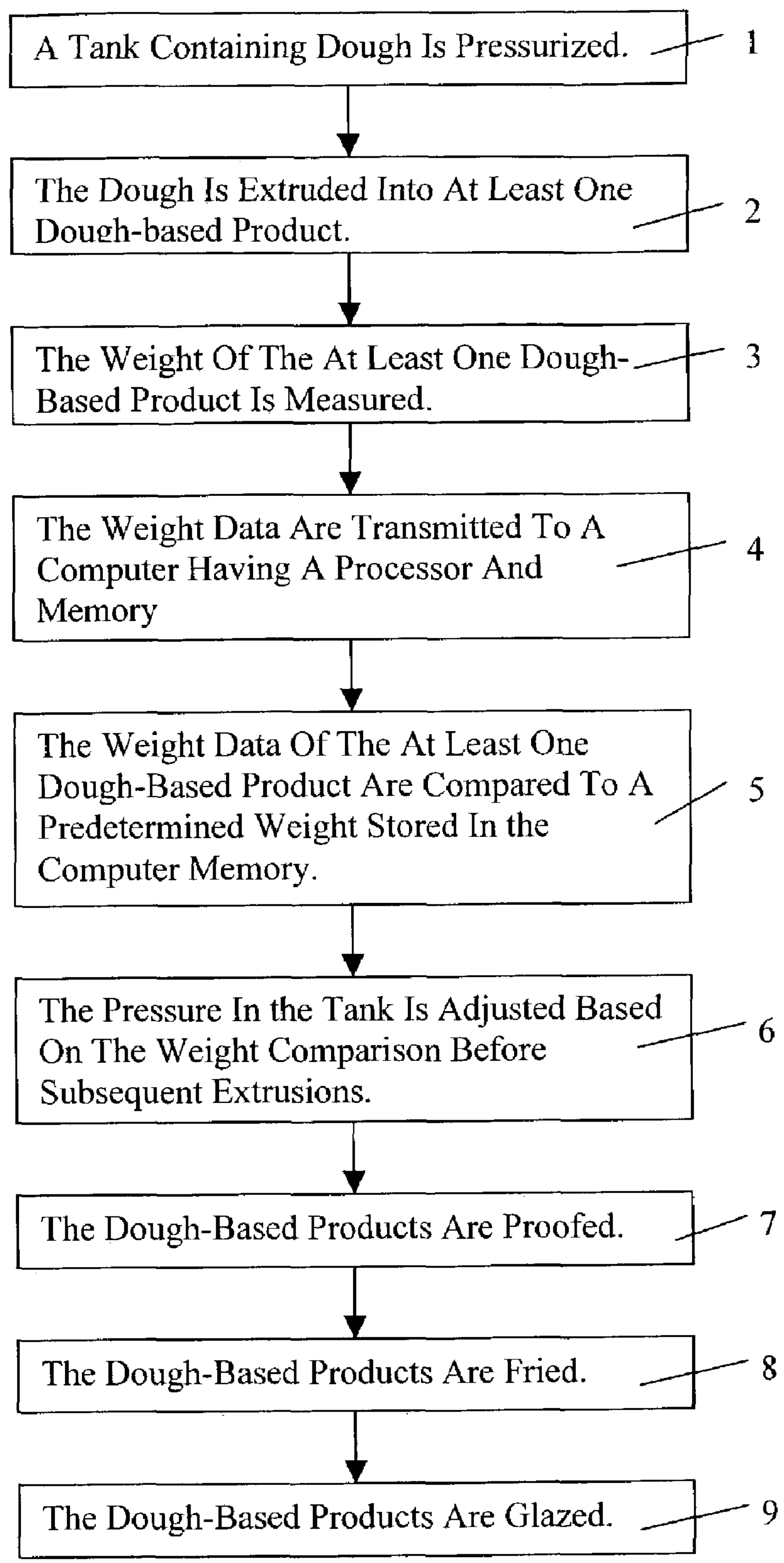
FIG. 1 is a flow chart which illustrates an embodiment of a method of the present invention for forming dough-based products.

Referring now to the figures, FIG. 1 is a flow chart illustrating an embodiment of the present invention for forming dough-based products. First, a tank containing dough is pressurized 1. The dough is extruded 2 into at least one dough-based product. The weight of the at least one dough-based product is measured 3. Data relating to the weight of the at least one dough-based product are transmitted 4 to a computer having a processor and memory. The weight data are compared 5 to a predetermined weight stored in the computer memory. Based on the weight comparison, the pressure in the tank is adjusted 6 (or not adjusted if the weight data and the predetermined weight are the same) before subsequent extrusions. The dough-based products may then proceed for further processing, such as proofing 7, frying 8 and glazing 9. This embodiment and other embodiments of the present invention are discussed in detail below.

Figure 2:
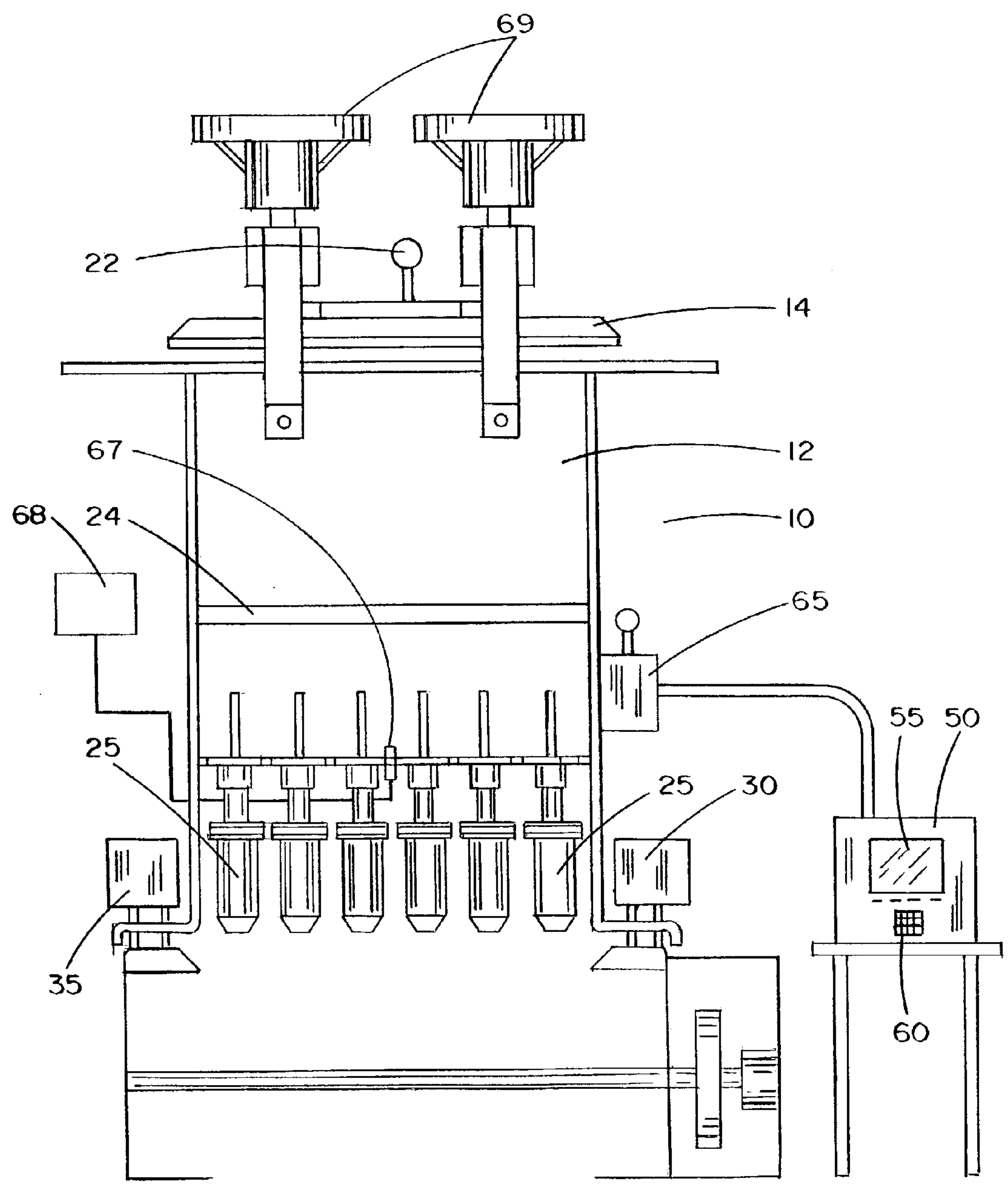
FIG. 2 is a front elevational view of an embodiment of an apparatus for forming dough-based products of the present invention.
Figure 3:
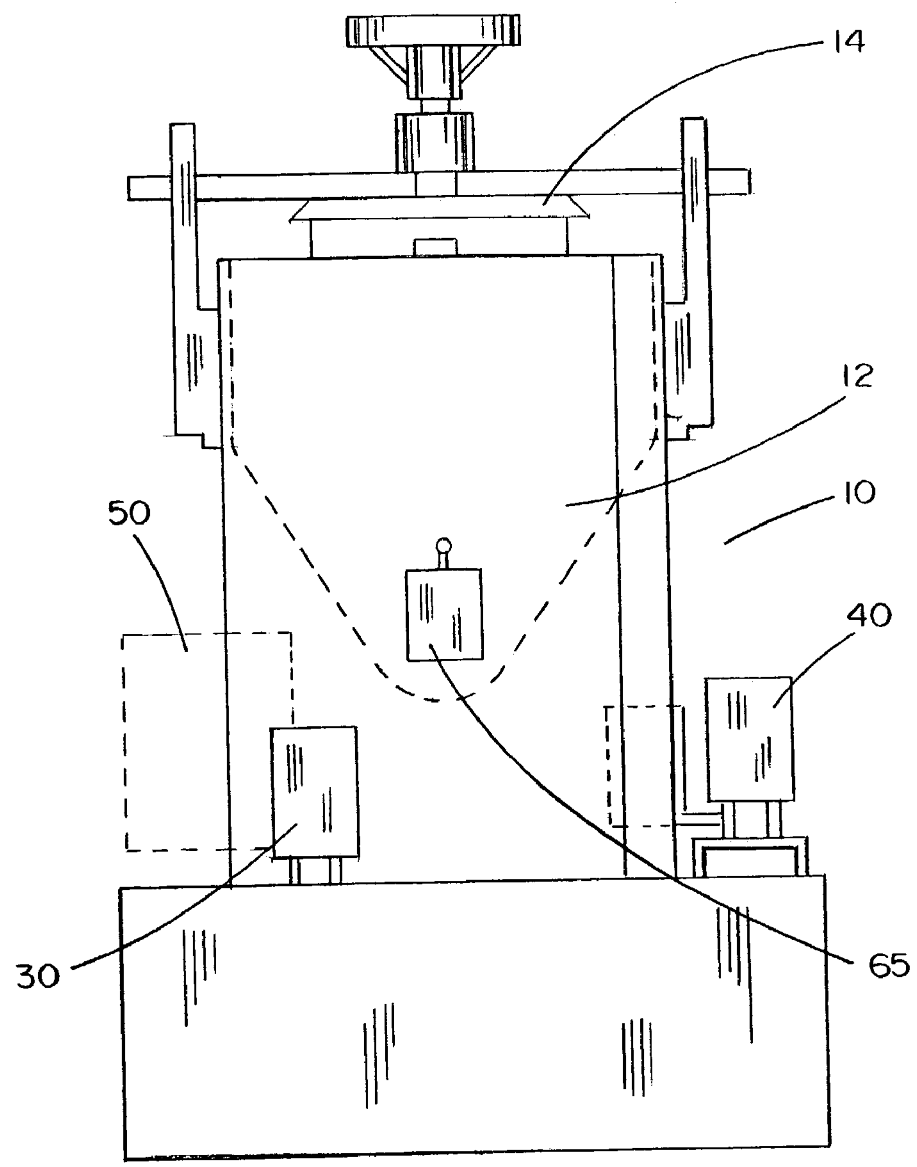
FIG. 3 is a side elevational view of an embodiment of an apparatus for forming dough-based products of the present invention.
Figure 4:
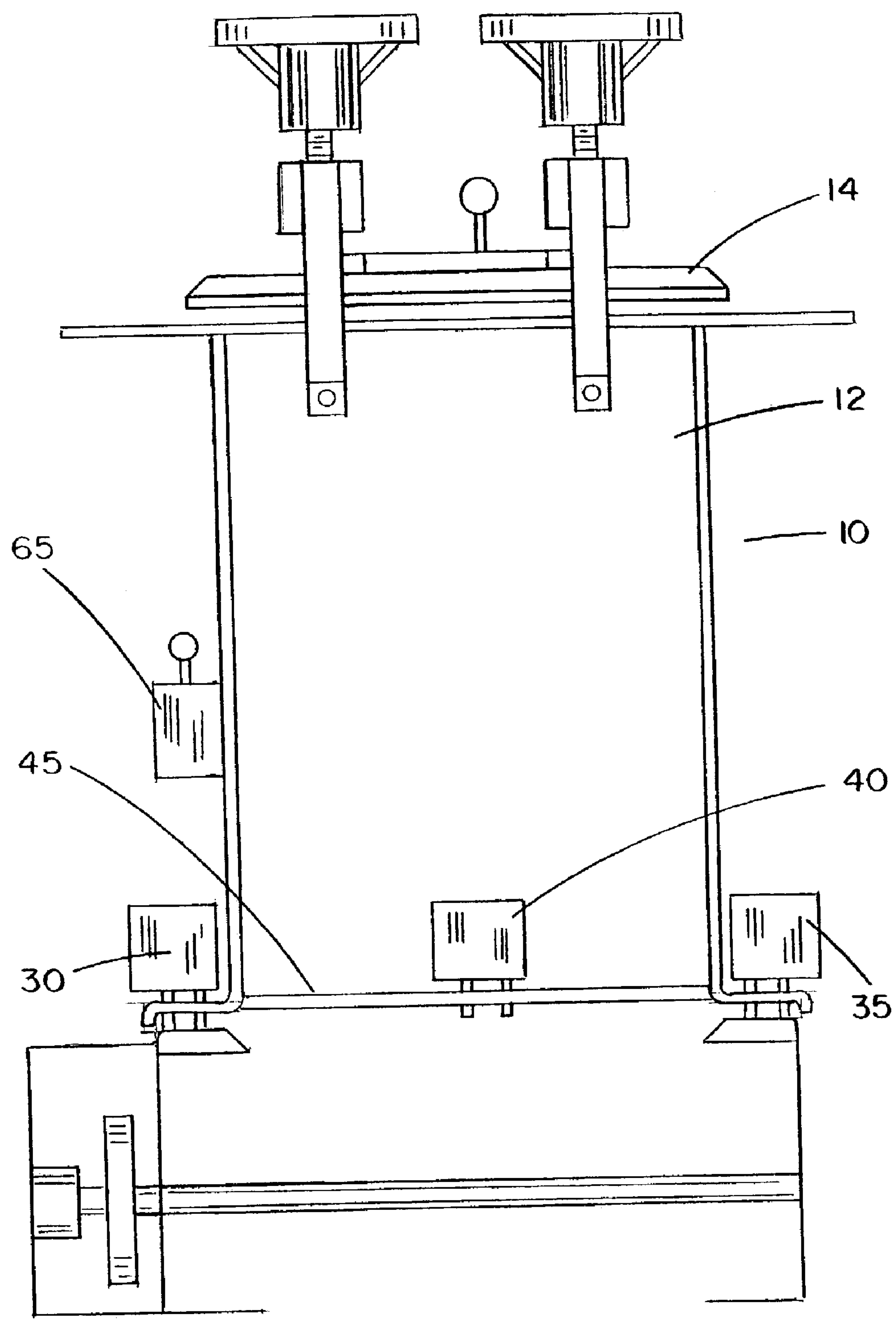
FIG. 4 is a rear elevational view of an embodiment of an apparatus for forming dough-based products of the present invention.

FIGS. 2–4 represent various views of an embodiment of an apparatus 10 of the present invention. FIG. 2 is a front elevational view of an embodiment of an apparatus 10 for forming dough-based products. FIG. 3 is a side elevational view of the apparatus 10 and FIG. 4 is a rear elevational view. The operation of the apparatus 10 is described below in connection with the methods of the present invention.

In an embodiment of a method of the present invention for automatically forming dough-based products, a tank 12 containing dough is pressurized. The tank 12 preferably has a screw down lid 14 in which mixed ingredients (e.g., dough) are loaded and sealed. The dough may be added to the tank in a number of ways. In one embodiment, the dough is loaded in the tank 12 using a hopper when the tank lid 14 is open.

The tank 10 has an air inlet, which allows air to enter the tank 12 and pressurize it. The air may be supplied from a number of sources, such as portable compressors or house air originating from a large compressor (e.g., air that is supplied to an entire facility). The source of air may be coupled to an air pressure controller 65 and an air input 15 to regulate the amount of air that enters the tank 12 based on signals from a computer 50. The initial air pressure in the tank 12 depends on the types of dough-based products being formed. For example, an acceptable initial air pressure for the production of ring doughnuts is twenty-four (24) pounds per square inch (psig). After dough is loaded into the tank 12 and the tank lid 14 is sealed, the tank 12 may be pressurized to the initial air pressure.

The dough is extruded and cut into individual dough-based products by an extruding mechanism 25, typically positioned at the bottom of the tank 12. An example of an extruding mechanism 25 useful in the present invention is a tube and a cutter arrangement. During a timed sequence or line size, the cutters at the bottom of the extruder open (i.e., the sleeves move up exposing a specified length of the center shaft). The dough is pushed out through the series of openings by the air pressure during a specified period of time (typically, 0.75 seconds). Dough-based product size and shape are determined by the air pressure and cutter design. In one embodiment, several extruding mechanisms 25 are connected to the tank 12, such that an equivalent number of dough-based products may be formed with each cycle. The size of the tank 12 and likewise, the extruder apparatus 10, may vary depending on the number of extruding mechanisms 25. For example, the smallest tank may only have two extruding mechanisms while the largest may have twelve. Typically, the extruding mechanisms 25 are gauged together and are actuated by a single air cylinder. The extruding mechanisms 25 may be actuated at the same time, so that in one cycle, a flight of individual dough-based products are formed and may be released onto trays or other conveying mechanisms. The trays or other conveying mechanism carry the dispensed dough-based product to a proofer or other processing device.

According to the method of the present invention, the weight of the dough-based products in each flight is measured. The weight of the dough-based products in each flight may be measured in a number of ways. In one embodiment, the weight of the tank 12, including its contents, is measured after each flight of dough-based products is formed. The weight of the tank 12 after the flight of dough-based products is formed is compared to the weight of the tank 12 after the formation of the previous flight to determine the weight of the most recently formed flight of dough-based products. In one embodiment, the tank 12 is attached to at least one load cell that measures the weight of the extruder tank 12, the air pressure and the mixed ingredients (e.g., dough). The total weight is recorded between strokes of the extruder apparatus (i.e., after each extrusion to form dough-based products). Each weight is subtracted from the previous weight to determine the weight of the formed dough-based products.

Load cells useful in the present invention include Model Number SASC-767, commercially available from J. A. King of Greensboro, N.C. This particular load cell is rated to support a weight of two hundred fifty (250) pounds. In the embodiment of the present invention shown in the Figures, three load cells 30,35,40 are utilized. The load cells 30,35,40 are positioned such that they support the weight of the tank 12 and any dough in the tank. With three load cells, two load cells 30,35 may be positioned on each side of the extruder apparatus 10 and one load cell 40 is positioned in the back of the extruder apparatus 10. In other embodiments, four load cells may be used, with a load cell positioned at each corner.

The weight data from the load cells 30,35,40 may be transmitted to a computer 50 having a processor and memory (e.g., a weight indicator). An example of a useful computer in the present invention is a weight indicator, such as Model Number WI-130 manufactured by Weightronix. The computer 50 may include various software applications written to execute the steps of the present invention. Using the computer 50, including the software applications, the measured weight of the dough-based products in the flight is compared to a predetermined weight stored in the computer memory. If the measured weight is different from the predetermined weight, the computer 50 may adjust the pressure in the tank 12. The computer 50 may adjust the pressure in the tank 12 by transmitting a signal to an air pressure controller 65 coupled to a source of air pressure. If the measured weight is the same as the predetermined weight, no pressure adjustment may be necessary. In another embodiment, a predetermined weight range may be stored in the computer 50. If the measured weight is outside of the predetermined weight range, then the computer 50 may adjust the pressure in the tank 12. If the measured weight falls within the acceptable range, no pressure adjustment may be necessary.

A software application performs this comparison and determines the size of the pressure adjustment. The software application uses a control algorithm to determine the amount of pressure adjustment. Any number of control algorithms might be used, such as least squares or linear regression. The computer program uses the actual production data (e.g., the actual dispensed weight of the dough-based products) received from the at least one load cell and compares it to the control algorithm programmed into the system that is based on one or more parameters (e.g., a target weight range) that are associated with a particular production run. As will be discussed below, the memory of the computer 50 may include a database with parameters stored for each type of dough-based product. If the weight of the product is different from the target weight, then the system adjusts the air pressure in the extruder apparatus 10 before extruding the next flight of dough-based products.

In one embodiment, the software application determines the new pressure (the pressure including an adjustment based on the prior weight of the dough-based products) using the following formula:

$$\text{New Press} = \text{Last Press} - \left(\frac{ActualWt - TargetWt}{TargetWt}\right)(\text{Last Press})(FeedbackAdjustment)$$

The actual weight (ActualWt) is the measured weight of the extruded dough-based products. The target weight (TargetWt) refers to the desired weight of the dough-based product that is also stored in a database. The last pressure (LastPress) is the air pressure in the tank for the extrusion that formed the dough-based products with the actual weight. The feedback adjustment is a specified parameter that correlates the difference in weight to the pressure adjustment. The feedback adjustment is typically expressed as a percentage and any percentage may be used in order to achieve a desired result. In one embodiment, the feedback adjustment may be between zero and fifty percent. In other embodiments, the feedback adjustment is greater than fifty percent and may be greater than one hundred fifty percent.

For example, a particular doughnut may have a target weight of 1.17 ounces per doughnut with six doughnuts being formed during a single extrusion (TargetWt=7.02 ounces). Further, the feedback adjustment for the extruder may be set at 25% or 0.25 (FeedbackAdjustment). After the twentieth extrusion, the pressure in the tank may be 22 psig (LastPress). The weight of the tray or flight of doughnuts formed by the twenty-first extrusion may be 1.3 ounces per doughnut or 7.8 ounces (ActualWt). Using the formula above, the tank pressure will be adjusted such that the tank pressure prior to the twenty-second extrusion will be 21.39 psig.

The computer 50 may include a database, which stores dough-based product formulas. The product formulas may be sorted by type of dough-based product and may include one or more of the following parameters: (1) identification of the particular dough-based product (e.g., ring doughnut, shell doughnut, cake doughnut, doughnut holes, etc.); (2) the number of cutters or extrusion mechanisms used during the extrusion of the dough (i.e., the number of dough-based products in a flight); (3) the individual predetermined dough-based product weight (e.g., a ring doughnut may have a target weight of 1.17 ounces); (4) the predetermined dough-based product weight range per dozen (e.g., a dozen ring doughnuts may weigh 14.04 ounces); (5) initial air pressure for the tank; and (6) a number of trays to skip after each extrusion.

In an embodiment where a parameter in the product formula is the number of trays to skip after each extrusion, the user may utilize this parameter to specify the number of trays to skip between extrusions. As noted above, the extruding mechanisms may be actuated to form and release a flight of individual dough-based products onto trays or other conveying mechanisms. In an embodiment where trays are utilized to convey the extruded dough-based products, the computer can control the number of trays to skip before the next flight of dough-based products are extruded (i.e., the number of trays to skip between extrusions). In one embodiment, the trays and skipped trays may be counted using techniques known to those of ordinary skill in the art. For example, in embodiments where the trays are transported using a chain, belt, or other endless conveyor-type arrangement, a cam having at least one lobe may rotate as the trays pass. As the cam rotates, the at least one lobe may contact a solenoid when transmits a signal to the computer. In other embodiments, a light beam may be used to count the trays. In other embodiments, a proximity switch may be used. The computer may be programmed with data relating to the trays (e.g., the rate at which the trays travel, the dimensions of the trays, and/or the amount of time that would elapse between extrusions if dough-based products were extruded on each tray).

If a user specifies that zero trays are to be skipped between extrusions, then the extruding mechanisms will be actuated to form and release a flight of individual dough-based products onto each tray. In one embodiment, the default number of trays to skip for each formula may be zero. If a user specifies that one tray is to be skipped between extrusions, then the extruding mechanisms will be actuated to form and release a flight of individual dough-based products onto every other tray. If a user specifies that two trays are to be skipped between extrusions, then the extruding mechanisms will be actuated to form and release a flight of individual dough-based products onto a first tray, skip two trays, form and release a flight of individual dough-based products onto a fourth tray, skip two trays, etc.

The ability to specify the number of trays to skip between extrusions advantageously allows a user to control the production rate of the dough-based products. For example, if the apparatus is in a retail store and the manager knows that the store sells fewer dough-based products during certain times of the day, the manager may specify that a certain number of trays are to be skipped when extruding the dough-based products. By skipping trays, the manager reduces the rate of production while still producing fresh dough-based products for the customers that do arrive during the slow production period.

The computer also may include a user interface device. As used herein, the term "user interface" includes, without limitation, the terms user interface display, control panel, controller, control panel, control pad, operator panel, and other terms that describe a screen to view, select, and enter information related to the extruder apparatus, cutters, dough-based product, dough-based product weight, etc. With a user interface device, a person using an apparatus of the present invention may select a formula for a particular dough-based product or may define the parameters for a particular production run. The embodiment of the present invention shown in FIG. 2 includes a computer 50 having a display 55 and user input means 60. In another embodiment, a formula may be selected or parameters may be defined from a remote terminal and communicated to the computer over a network.

In one embodiment, a user may be required to enter an identification number, an identification code, a password, or similar user identification means before the user can access the computer. For example, the computer may ask the user to enter an identification number before selecting a formula or modifying a parameter. The computer may also ask the user to enter an identification number in order to change product formulas, to add or delete product formulas, and/or to modify system parameters. If the user enters a valid identification number, the computer may allow the user to operate the computer. If the user does not enter a valid identification number, the user may not operate the computer. In a further embodiment, the computer may store data relating to a user's operation of the apparatus (e.g., number of tanks filled during a given shift, number of cuts made per tank, etc.).

It may be desirable for the computer to store global parameters in addition to parameters associated with dough-based product formulas. These global parameters are the same for any product formula selected. Such global parameters may include, for example: (1) the number of cutters on the extruder; (2) the number of samples for a particular control algorithm (e.g., the number of samples for a least squares fit slope calculation); (3) the minimum number of cycles before a pressure adjustment; (4) the maximum tank pressure; (5) the time after the cutter or extruding mechanism closes (i.e., after a product is formed) before the weight is measured; (6) the time that the cutter or extruding mechanism remains open; (7) the percentage to adjust the pressure by; (8) the amount of idle time before a screen saver is activated; (9) a password; and (10) the enablement of blowout detection (discussed below). In other embodiments, these parameters may be separately stored with each product formula. These global parameters may be set or modified by an operator with a user interface device located at the apparatus or by a person at a remote terminal sending instructions to the computer over a network.

In another embodiment, the computer may include a default program. The default program may restore the global parameters, the product formulas, and other parameters to a default setting. Thus, the default program acts as a back-up should any parameter or product formula be changed. For example, if a user inadvertently modifies a global parameter that adversely affects production, the user may restore the computer to its default settings by running the default program. The default program may be particularly helpful if a user does not know what parameter was changed. In one embodiment, the default program is stored in the computer's memory. A user may need a special password in order to run the default program and restore the default setting.

The user interface display 55 may display one or more parameters for an operator of the apparatus to view. Examples of such parameters that may be displayed include, without limitation: (1) the target product weight (i.e., a predetermined weight); (2) the current product weight (i.e., actual or measured weight); (3) the formula in use (e.g., a formula number and name); (4) the number of dispensed cycles so far; (5) the accrual weight of the dough; (6) whether blowout detection is enabled; (7) a stop softkey and a restart softkey, which will allow a restart on a false detection of blowout; and (8) an employee identification number or code.

In one embodiment, the product formulas and global parameters are password protected. By requiring a password to modify the formulas and parameters, a company may restrict access such that only authorized personnel may make changes.

As discussed above, the weight data from the load cells 30,35,40 are transmitted to the computer 50. The measured weight of the dough-based products in the flight is compared to a predetermined weight stored in the computer memory. If the measured weight is different from the predetermined weight, the computer 50 may adjust the pressure in the tank 12. If the measured weight is the same as the target weight, no pressure adjustment may be necessary. In another embodiment, a predetermined weight range may be stored in the computer. In this embodiment, if the measured weight is outside of the predetermined weight range, then the computer adjusts the pressure in the tank. If the measured weight is within the predetermined weight range, then no pressure adjustment is made.

The computer 50 may adjust the pressure in the tank by transmitting a signal to an air pressure controller 65 coupled to a source of air pressure 20. When the computer used is Model Number WI-130 from Weightronix, the air pressure controller should be capable of accepting a 4–20 milliamp input and controlling pressure, such that a signal of four milliamps corresponds to a pressure of zero psig and a signal of twenty milliamps corresponds, to maximum pressure. An example of an air pressure controller useful in the present invention is a MAC valve, such as Model No. 825C-PM-501-JA-572 commercially available from MAC Valve, Inc. of Wixom, Mich. In this embodiment, the air pressure controller may also include other valves and an air cylinder in communication with the MAC valve. The source of air pressure may be coupled to the air cylinder. An example of an air cylinder useful in the present invention is a Bimba cylinder, such as Model Number J1F80, commercially available from Scott Equipment, Inc. of Huntsville, N.C.

In other embodiments that utilize a Weightronix Model Number WI-130 computer, the air pressure controller may be a transducer. In one embodiment, a transducer useful in the present invention is capable of accepting a 4–20 milliamp input and controlling pressure, such that a signal of four milliamps corresponds to a pressure of zero psig and a signal of twenty milliamps corresponds to maximum pressure. An example of a transducer useful as an air pressure controller in the present invention is an Efector #500 transducer, Model # PA3226, commercially available from IFM Efector Inc. of Exton, Pa. In this embodiment, the air pressure controller may also include other valves and an air cylinder in communication with the transducer. The source of air pressure may be coupled to the air cylinder. An example of an air cylinder useful in the present invention is a Bimba cylinder, such as Model Number J1F80, commercially available from Scott Equipment, Inc. of Huntsville, N.C.

The air pressure controller 65 receives a signal from the computer 50, which instructs the controller 65 to allow additional air into the extruder tank 12 or to release air from the extruder tank 12. For example, if the computer 50 determines that the air pressure in the tank 12 needs to increase, the computer 50 will transmit a signal to the air pressure controller 65 and the air pressure controller 65 will allow more air to enter the tank 12. Using a Weightronix computer, the software will instruct the MAC valve or the transducer to allow air to enter the tank.

In a further embodiment of a method of the present invention, electronic dough-based production data is collected, transmitted, stored and used for useful decisions. This production data may be used to (1) provide one or more useful reports; (2) track ingredients used to make dough-based products; (3) automate re-orders; (4) automate shut down when the dough supply is low; (5) automate audible alarms to alert an operator, including low product and safety alarms; and/or increase production flexibility. For example, data relating to the measured weight of the dough-based products and pressure adjustment may be stored. This stored data may be used to adjust the process parameters of a proofer (e.g., proofer humidity, proofer temperature, proofer run time, etc.) or the process parameters of a fryer (e.g., fryer temperature, fryer run time, etc.).

In another embodiment, a method of the present invention may comprise determining when the supply of dough in the tank 12 is low. One way in which this may be accomplished is by monitoring the pressure in the tank 12 for pressure loss. When the amount of dough in the tank is low, one of the extruding mechanisms 25 may not have enough dough to extrude a dough-based product. If there is not enough dough to fill an extruding mechanism 25, then air will escape through the extruding mechanism 25 and a loss of pressure in the tank 12 will occur. Thus, a loss of pressure is an indication that the supply of dough in the tank 12 is low.

The tank 12 may be monitored for pressure losses using a detector or sensor in the tank 12. The pressure loss detector may not be activated (i.e., may not begin monitoring) until a predetermined number of cuts or extrusions have occurred. In a further embodiment, the number of extrusions or cuts may be counted. The number of extrusions or cuts may be counted using an input/output module, such as the OPTO 22 I/O module commercially available from OPTO of Temecula, Calif. The input/output module receives a pulse each time the extruding mechanism cycles. The input/output module is in communication with the computer 50 and the number of cycles may be displayed on a display 55 of the computer 50 in real time. Further, the computer 50 activates the pressure loss detector when a predetermined number of cuts or extrusions have occurred and the system begins looking for a blowout.

As noted above, in one embodiment, blowout detection is a global parameter and a user may specify whether it should be enabled or disabled. Similarly, the user interface device may display whether blowout detection is enabled. The formula for each dough-based product may specify the number of cuts before the pressure loss detector is activated.

As opposed to using a pressure loss detector in the tank to detect blowouts, an alternative embodiment involves using a digital output provided by the air pressure controller 65. In this embodiment, the digital output indicates that an air pressure consistent with a blowout has been achieved.

In additional embodiments, the computer 50 may trigger certain events when a blowout is detected. For instance, the computer 50 may stop the extruder apparatus when a blowout is detected by transmitting an output signal. Likewise, the computer 50 could also transmit an output signal that would sound an alarm when a blowout is detected. Alternatively, the computer 50 could be programmed to trigger the alarm after the pressure loss detector is activated. The alarm would alert an operator, who could be working on other tasks, to return to the extruder apparatus 10 and prepare to start a new production run or stop production.

In another embodiment of the present invention, an operator may choose to disconnect the system (i.e., disconnect pneumatic hoses from air pressure controller, turn off the computer, etc.) and operate the system manually. In this embodiment, conventional valves and pressure adjusting devices remain installed on the extruder. By reconfiguring the pneumatic hoses, the operator may bypass the automatic system and control the extruder manually.

In further embodiments of methods of the present invention, after extrusion, the dough-based products may be proofed at a proofer using methods and apparatuses known to those of ordinary skill in the art. After proofing, the dough-based products may transported to a fryer where they are cooked using methods and apparatuses known to those of ordinary skill in the art. After the dough-based products are fried, they may be transported for additional processing. In some embodiments, the dough-based products may be glazed in accordance with methods and apparatuses known to those of ordinary skill in the art. The dough-based products may also be iced. If the dough-based products are doughnut shells, they may be filled with a jelly or cream filling.

In the embodiment shown in FIGS. 2–4, the apparatus 10 comprises an extruder tank 12 having an air inlet 15. A source of air pressure 20 is connected to the air inlet 15 to control the pressure in the tank 12. While the air inlet 15 is shown at the top of the apparatus 15 in the figures, it may be positioned at any convenient location. The source of air pressure 20 may be a portable air compressor, a blower or house air originating from a large compressor (e.g., air that is supplied to an entire facility). The tank preferably has a screw down lid 14 in which mixed ingredients (e.g., dough) are loaded and sealed. The tank 12 may also be equipped with a pressure gauge 22 for an operator to monitor the air pressure. In some circumstances, the operator may desire to disable the automatic formation of dough-based products using the method of the present invention and may revert to manual operation. Under manual operation, the operator may monitor the air pressure using the gauge 22. A bar 24 extends across the front of the apparatus 10 and assists in preventing the apparatus 10 from spreading due to its placement on load cells.

The apparatus 10 also includes at least one extruding mechanism 25, which may be cutters, knives or other extruding devices known in the industry that may be used for extruding and cutting dough-based products. In one embodiment, the extruding mechanism 25 extrudes and cuts individual dough-based products. An apparatus of the present invention may be equipped with multiple extruding mechanisms, such that several individual dough-based products may be extruded and cut at the same time. As shown in FIGS. 2–4, the apparatus 10 includes six extruding mechanisms 25. In this embodiment, six dough-based products are formed with each cycle of the extruding mechanisms 25. The dough-based products are formed simultaneously and are released onto trays or another conveying mechanism.

In another embodiment of the present invention, the extrusion apparatus has optional "baffles" which may be installed inside the pressure chamber to block dough flow to some of the extruding mechanisms. The baffles may be used during low traffic times of day to reduce the rate of production. The dough-based products may be produced in odd or even numbers. In an embodiment of the present invention, the dough-based composition and cutters can be arranged to produce at least four products—rings, shells, cinnamon buns, and doughnut holes. Each of these products has different target weights.

The extruder tank 12 is positioned on at least one load cell. In the embodiment shown, the tank 12 is positioned on three load cells 30, 35, 40. Two load cells 30, 35 are positioned on each side of the apparatus 10 and a third load cell is positioned in the back of the apparatus 10. A bar 45 extends across the back of the apparatus and provides the load for the rear load cell 40. The rear load cell 40 is centered and bolted to the bar 45. The load cells are coupled with a computer 50 having a processor and memory. The computer 50 may include a display 55 for an operator to view, for example, dough-based product formulas, global parameters or production data. The computer 50 may also include user input means 60 (e.g., a keyboard, mouse, touchscreen, touch pad, softkeys, etc.) to allow an operator to navigate menus, enter formulas, view production data, enter or view global parameters, etc.

An air pressure controller 65 is coupled with the computer 50 and with the source of air pressure 20. The air pressure controller 50 receives signals from the computer 50 indicating pressure adjustments that need to be made. If the air pressure needs to increase, the air pressure controller 50 allows air to enter the tank 10. For example, a Weightronix computer communicates a milli-amp signal to the air pressure controller and the air pressure controller converts the signal to a pressure command to open to either release or add pressure to the tank based on the command. As noted above, the air pressure controller may be, for example, a MAC valve or a transducer.

A thermometer 67 is positioned in the tank 10, as shown in FIG. 2. The thermometer 67 monitors the temperature of the dough in the tank 10. An example of a thermometer useful in the present invention is a resistance temperature detector, such as Model Number RB115S6125100PT1723AA, commercially available from GIC ThermoDynamics Inc. of Royal Oak, Mich.

In one embodiment, the thermometer 67 is in communication with a transmitter 68, which receives data from the thermometer 68 and may deliver it to the computer 50 or to another computer or piece of processing equipment. An example of a transmitter useful in the present invention is resistance temperature detector transmitter, such as Model Number TX 1501, commercially available from Omega Engineering of Stamford, Conn.

The temperature data may be collected, transmitted, stored and used in a number of ways. The temperature data may be used, for example, to make pressure adjustments in the extruder tank and/or to make adjustments to other process steps or equipment. For example, the temperature data may be used to set the initial air pressure in the tank. If the dough has a certain temperature when initially placed in the tank, the computer may correlate a preferred initial air pressure to that temperature.

As noted above, the tank 12 preferably has a screw down lid 14. Mixed ingredients (e.g., dough) are added to the tank 12 and the lid 14 is secured and sealed to the tank 12. In the embodiment shown in FIGS. 2–4, the lid 14 is secured and sealed to the tank 12 by two hand wheels 69, which tighten screws into corresponding receptacles on the lid when turned. The hand wheels 69 are manually turned to tighten the lid.

Figure 5:
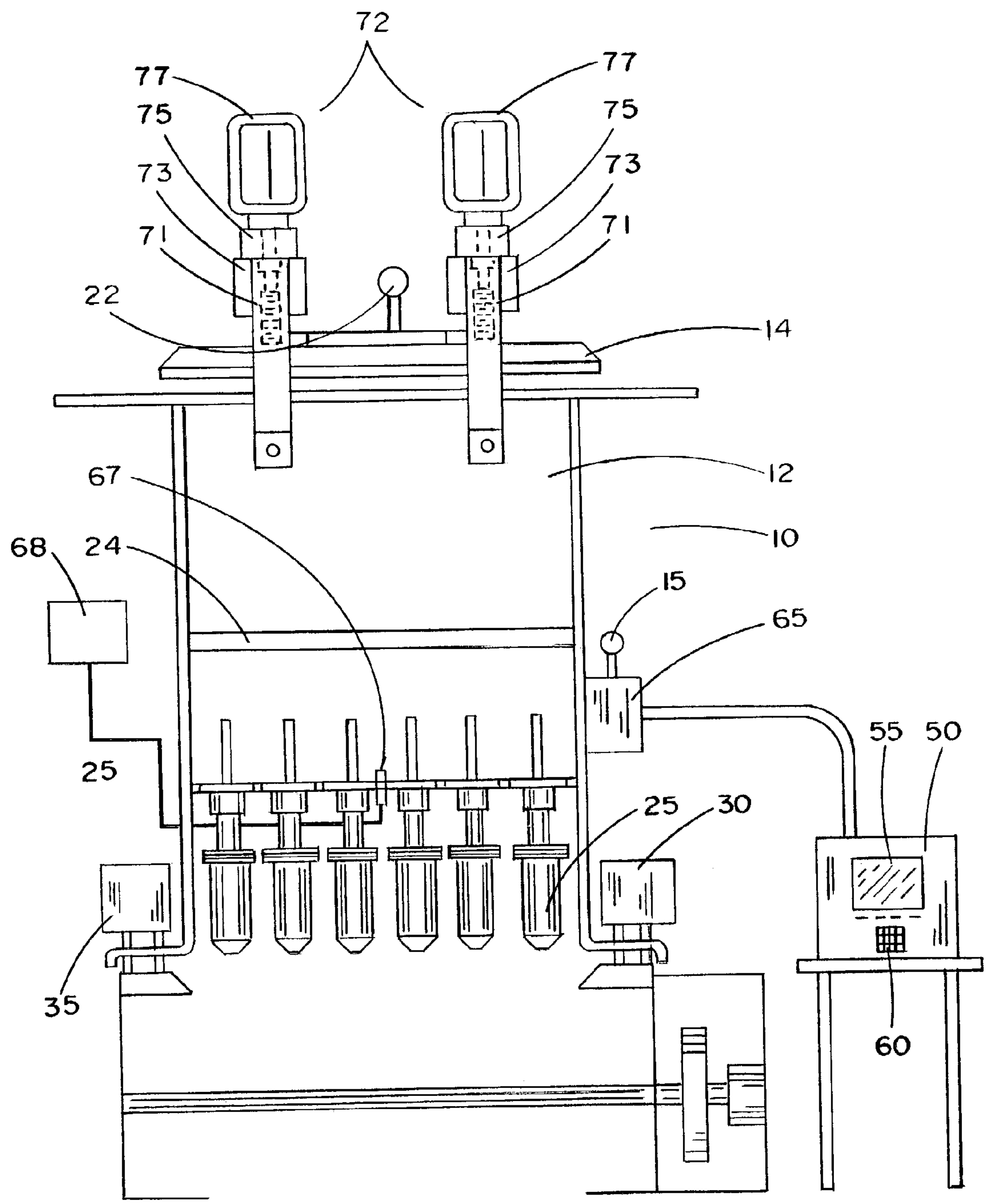
FIG. 5 is a front elevational view of another embodiment of an apparatus for forming dough-based products of the present invention
Figure 6:
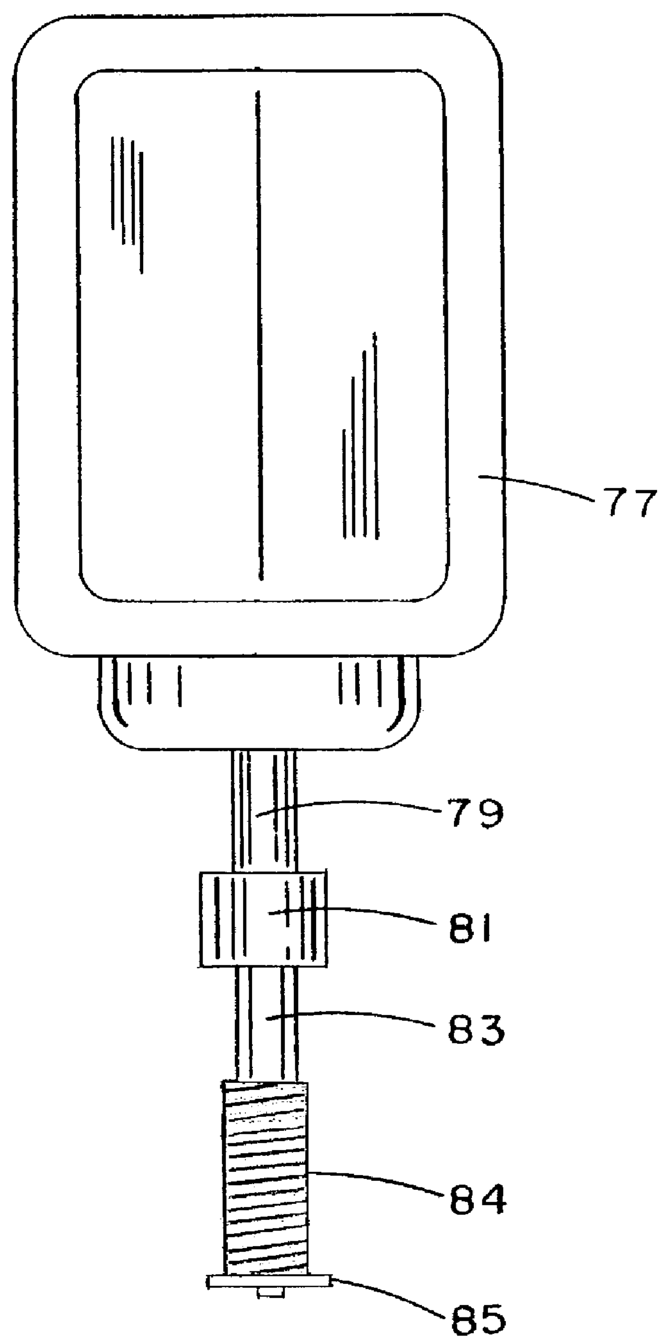
FIG. 6 is a front elevational view of one embodiment of an automated lid tightener.

In another embodiment of the present invention, the lid 14 may be tightened using automated lid tighteners. FIG. 5 is a front elevational view of the same embodiment of an apparatus for forming dough-based products of the present invention as shown in FIG. 2, except FIG. 5 includes two automated lid tighteners 72. FIG. 6 is a front elevational view of one embodiment of an automated lid tightener 72.

Referring now to FIG. 5, two lid securing bars 71 are positioned over the lid 14. When the lid 14 is to be opened, the lid securing bars 71 rotate toward their respective sides (away from the middle of the lid 14) to allow the lid 14 to be raised. When in a vertical position (as shown in FIG. 5), the lid securing bars 71 may secure the lid 14 using the automated lid tighteners 72. The automated lid tighteners 72 are held on lid securing bar 71 by a clamp 73. A cylinder 75 is attached to each clamp 73 and is fitted to hold a motor 77 associated with each automated lid tightener 72. The motor 77, when activated, turns a shaft having a counterbored locking device (shown in FIG. 6). When the counterbored locking device is rotated by the motor 77 in a lid closing direction, the locking device threads through the lid securing bars 71 and makes contact with the lid 14. After contact with the lid 14, the locking device continues to turn and torques down on the lid based on the air pressure delivered to the motor 77 for torquing.

As shown in FIG. 6, one embodiment of an automated lid tightener 72 comprises a motor 77, a shaft 79 extending from the motor 77, a socket 81 having an allen wrench extension 83 secured to the shaft 79, and a counterbored locking device 84 secured to the allen wrench extension 83. In one embodiment, the motor 77 is a motorized butterfly air wrench, which can turn the shaft 79 in either radial direction. An example of a motorized butterfly air wrench useful in embodiments of the present invention is Model No. 5Z 118, manufactured by Westward Tools of Lake Forest, Ill. This model butterfly wrench is a three-eighths inch (3/8") wrench that can turn at 11,000 rpm and operates at psig. The motor 77 preferably also includes a shaft 79 to which the socket 81 may be attached.

The socket 81 having an allen wrench extension 83 may be a nine-sixteenths inch (9/16")×three-eighths inch (3/8") drive socket, which is generally available at most hardware stores. The allen wrench extension 83 may be a nine-sixteenths inch (9/16") allen wrench, which is generally available at most hardware stores. The allen wrench extension 83 may be secured to the socket 81 by a rollpin.

The counterbored locking device 84, in one embodiment, may be prepared from a one inch (1") diameter set screw with approximately eight threads per inch. In one embodiment, the counterbored locking device 84 is two and one-half inches (2.5") long. Other sizes and lengths may be used so long as the automated lid tightener sufficiently seals the lid to the tank. One end of the counterbored locking device 84 should be bored in order to receive the allen wrench extension 83. The counterbored locking device 84 may be secured to the allen wrench extension 83 to prevent the counterbored locking device 84 from sliding off of the allen wrench extension 83 using the clamp 73 and the cylinder 75, which is fitted to hold the motor 77. The counterbored locking device 84 is clamped in place when the motor 77 is mounted on the lid securing bar 71.

A plate tip 85 at the end of the counterbored locking device 84 may be welded to the other end of the locking device 84 (the end that contacts the lid 14) and provides a surface for closing the lid. The plate may be a solid piece of #302 stainless steel and may be welded in place with a three-sixteenths inch (3/16") tip in its surface.

Once assembled, the motor 77 rotates the shaft 79, which rotates the socket 81 having the allen wrench extension 83, which rotates the counterbored locking device 84. If the motor 77 is powered by air, the motor is preferably connected to a source of air. When operated in one direction, the motor 77 tightens the lid 14 on the tank 12. The motor 77 may be operated in a second direction to loosen the lid 14 so that more dough may be added to the tank 12. As shown in FIG. 5, an assembled automated lid tightener 72 fits into a cylinder 75, which is attached to a clamp 73. The automated lid tightener 72 may then be used to tighten or loosen the lid as described above.

Figure 7:
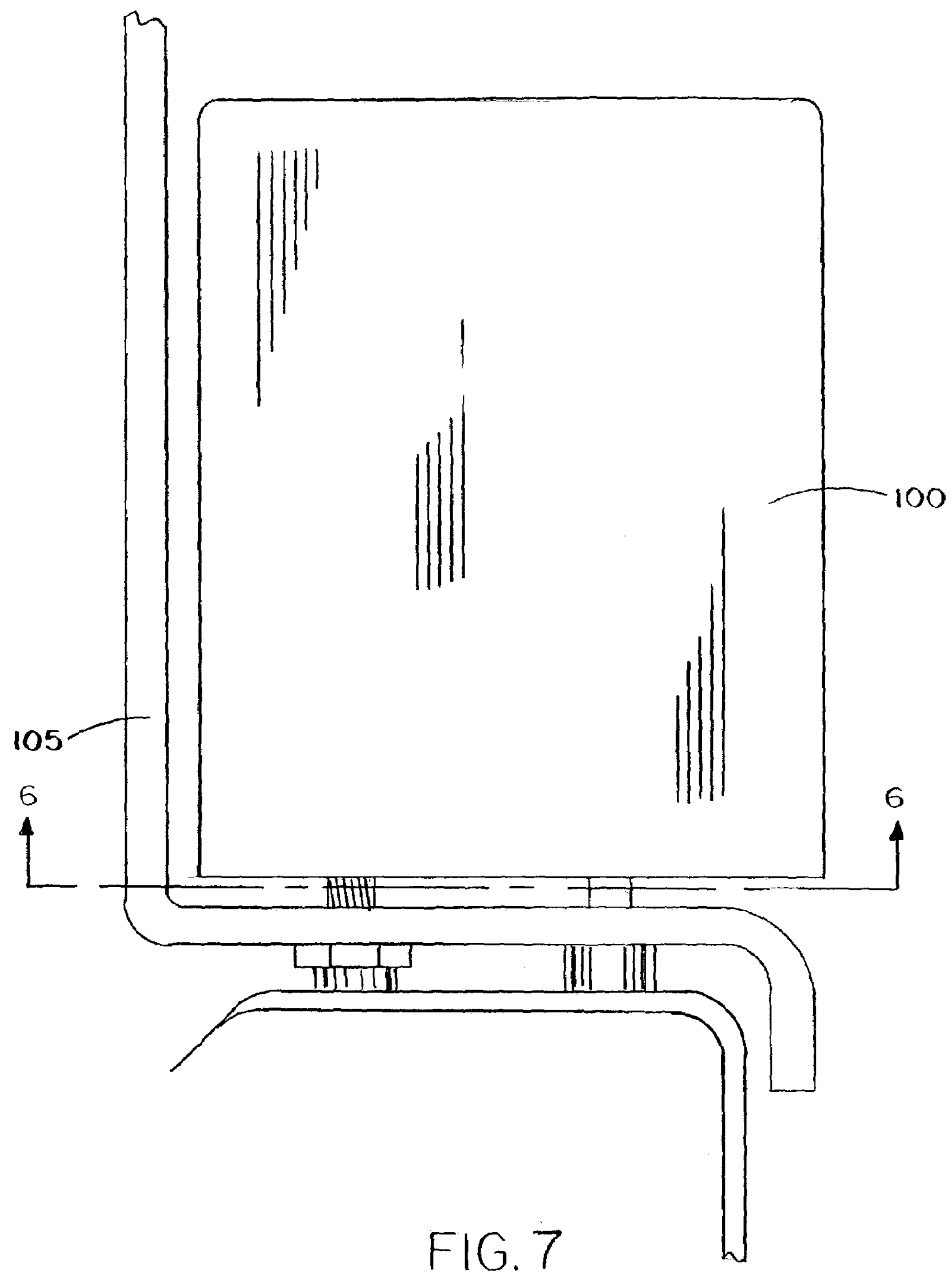
FIG. 7 is a front elevational view of a load cell assembly for use in an embodiment of an apparatus of the present invention.
Figure 8:
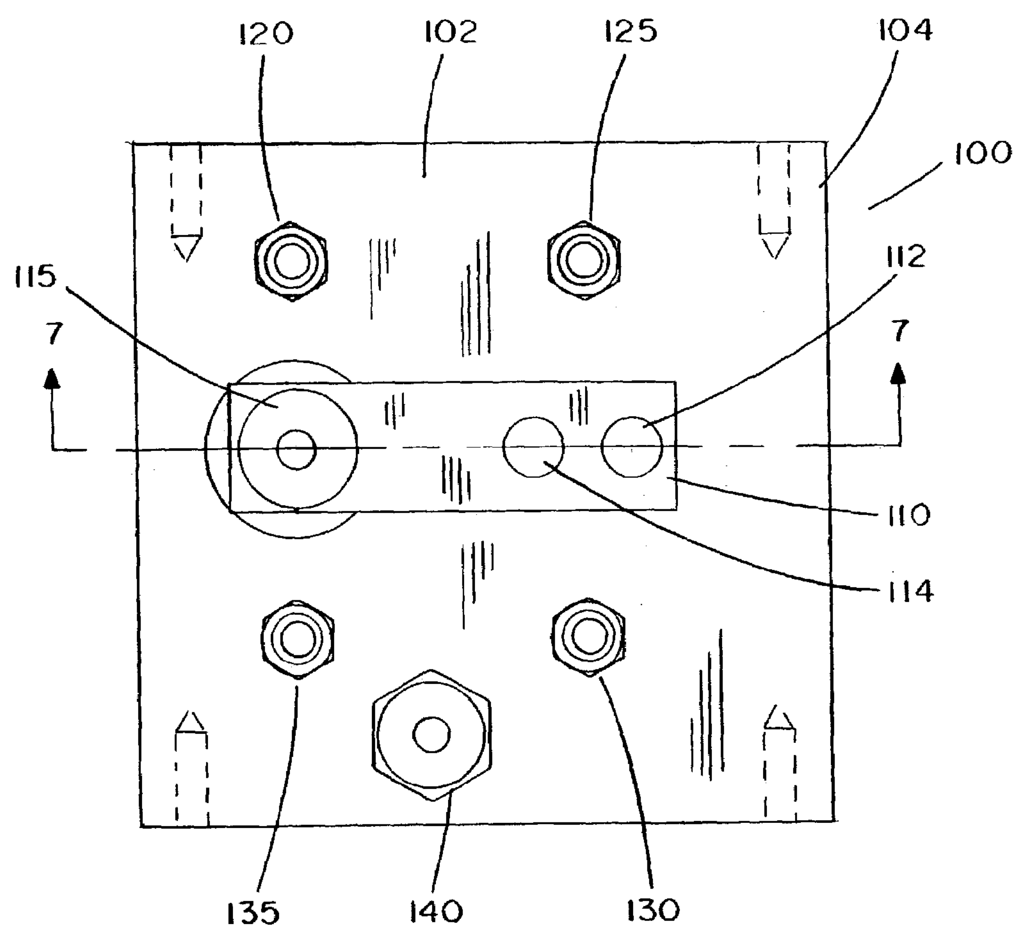
FIG. 8 is a cross-sectional view of a load cell assembly for use in an embodiment of an apparatus of the present invention taken along the line 8—8 in FIG. 7.
Figure 9:
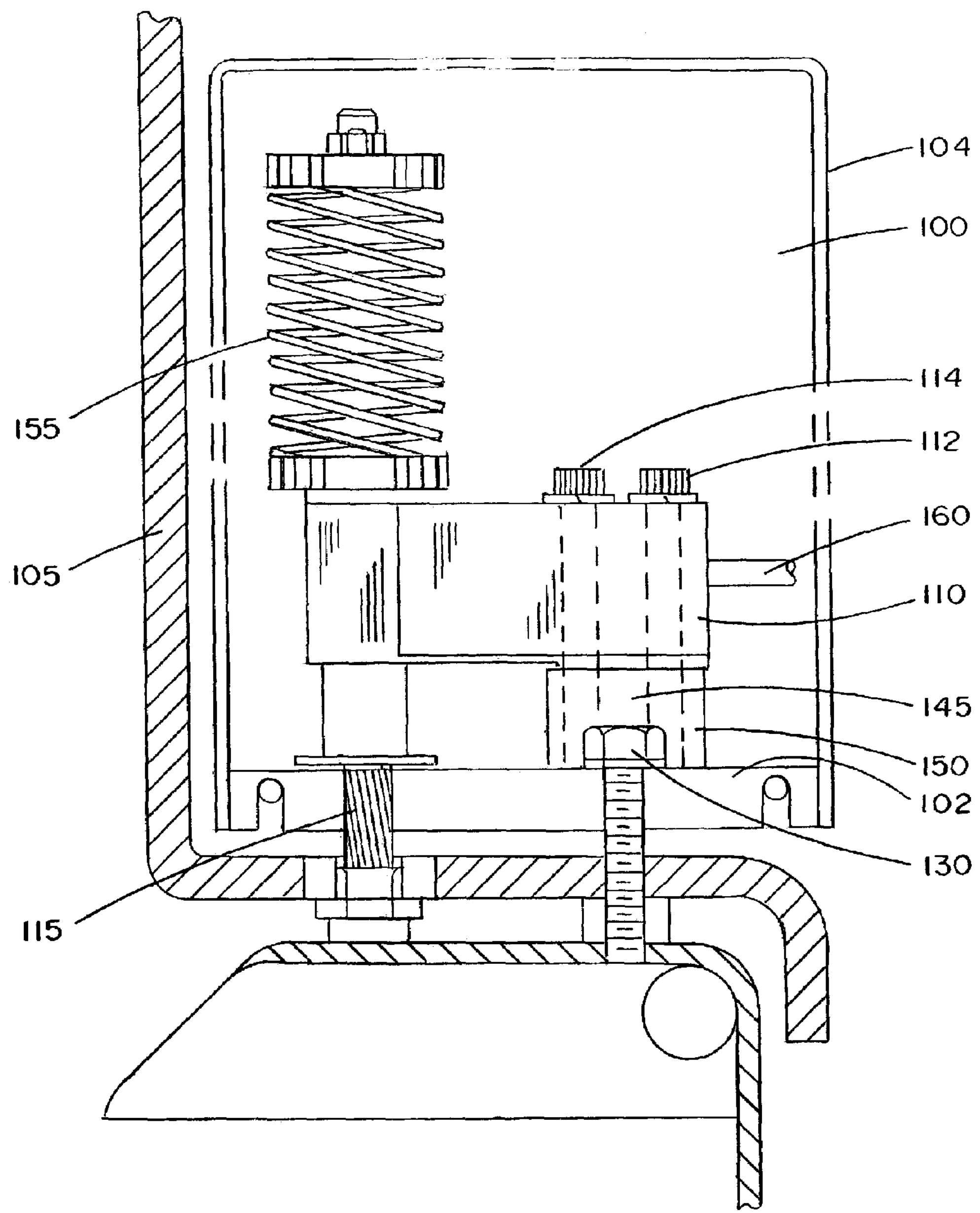
FIG. 9 is a cross-sectional view of a load cell assembly for use in an embodiment of the present invention taken along the line 9—9 in FIG. 8.

FIGS. 7–9 represent different views of a load cell assembly 100 for use in an embodiment of an apparatus of the present invention. Load cell assemblies useful in the present invention are commercially available from J. A. King Co. of Greensboro, N.C. FIG. 7 is a front elevational view of the load cell assembly 100. The load cell assembly 100 is attached to the extruder apparatus 105 and measures the weight of the tank, and any dough or air inside the tank.

FIG. 8 is a cross-sectional view of a load cell assembly 100 for use in an embodiment of an apparatus of the present invention taken along the line 8—8 in FIG. 7. FIG. 8 shows the bottom plate 102, a load cell assembly cover 104, four mounting bolts with spacers 120,125,130,135, a load cell 110, two load cell mounting bolts 112,114, a carrier 115, and a strain relief access port 140. The strain relief access port 140 is provided to prevent the pinching and cutting of electrical wires coming out of the load cell assembly 100.

FIG. 9 is a cross-sectional view of the load cell assembly 100 showing many of the same components illustrated in FIG. 8. FIG. 9 also shows two spacers 145,150 for the load cell mounting bolts 112,114, a spring overload 155, and a cable 160 for transmitting weight data to a computer.

In one embodiment, such as the one shown in FIGS. 8 and 9, the carrier 115 is a cable having a diameter of three-sixteenths of an inch (3/16"). In other embodiments, the carrier may be a cable, having a diameter of three-thirty-seconds of an inch (3/32") and having an exposed length of one-half of an inch (1/2"). A portion of the unexposed length of the cable may be surrounded by cylinder having a length of one-half of an inch (1/2"). The cylinder limits the side-to-side or lateral movement of the cable. The longer and smaller diameter cable provides more flexibility while the cylinder provides structural rigidity.

The mounting bolts 120,125,130,3135 secure the bottom plate 102 (and the load cell assembly) to extruder frame 105. The loadcell 110 is secured to the bottom plate 102 by the load cell mounting bolts. The carrier 115 is connected to the bottom of the extruder frame 105, such that as dough is extruded and the tank becomes lighter, the carrier 115 pulls the tank closer to the bottom plate 102 by virtue of the spring overload 155. The load cell 110 detects the amount of movement by the carrier 115 after each extrusion and transmits weight data to a computer. This weight data is transmitted to a computer by the cable 160. The computer converts the weight data signal from the load cell 110 to weight and may produce a weight digital output to a user interface display.

Figure 10:
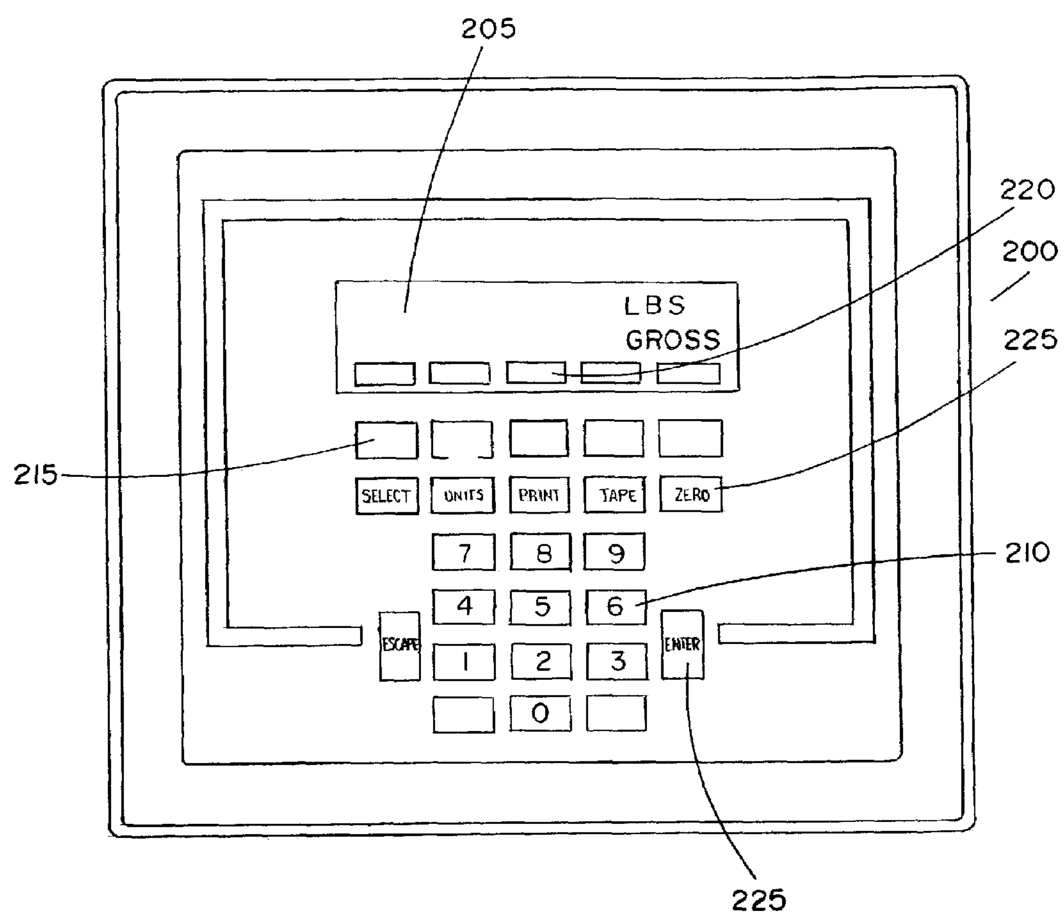
FIG. 10 is a front elevational view of a user interface device useful in an embodiment of the present invention.

The following discussion illustrates an example of how a method or system of the present invention may operate an extruder for one tank of dough. An operator loads the extruder tank with dough. Using an user interface device, the operator enters and employee identification number and then selects a product formula from a Main Screen. FIG. 10 illustrates an example of a user interface device 200 useful in an embodiment of the present invention. The user interface device 200 includes a display 205 and a number of touch keys for an operator to input requests. The touch keys include a numeric keypad 210, a row of soft keys 215 and various function keys 225. The row of soft keys 215 are positioned just below a menu 220 on the display 205. Since the menu changes (e.g., after an operator makes a selection), the functions of the different soft keys 215 also change. The functions keys 225 perform various tasks, such as clearing a user input ("CLEAR"), changing units on the display ("UNITS") and entering a user input ("ENTER").

On a main screen, the operator selects a product formula by pressing a soft key corresponding to "FORM" (i.e., formula) on the display. The computer, via the display, asks the operator to specify a product formula. The operator may choose from any number of product formulas that are stored on the computer. The operator enters a number corresponding to a particular product formula. If the formula is defined (i.e., stored on the computer), then the computer displays the formula name. If the formula is not defined a message, such as "Current Formula Undefined," is displayed to the operator. A setup screen allows for the entry of new formulas and for the editing of existing formulas, although access to these features may be restricted such that only the operator's supervisor may modify the product formulas or add new product formulas.

After selecting a valid product formula, the operator presses a soft key corresponding to "START" on the display to prepare for a production run. The computer displays additional information about the product formula selected (e.g., weight per dough-based product, number of extruding mechanisms, whether any baffles are installed and starting pressure). The operator then ensures that the extruder tank lid of the extruder apparatus is closed and securely fastened. The operator presses a soft key corresponding to "PRESS" on the display to pressurize the tank to the initial or starting pressure as specified in the product formula.

After pressurization, the operator presses a soft key corresponding to "START" to begin the production run. The user interface device shows the current dough-based product weight (e.g., ounces per product), the formula name, the pre-selected dough-based product weight (e.g., target weight), and the cycle number. A cycle is the process between signals from the conveyor cam switch that allows the extruder apparatus to automatically extrude the dough-based products.

The system includes a number of global parameters, parameters that are the same regardless of what product formula is selected. Such global parameters include, for example: (1) the number of cutters on the extruder; (2) the number of samples for a particular control algorithm (e.g., the number of samples for a least squares fit slope calculation); (3) the minimum number of cycles before a pressure adjustment; (4) the maximum tank pressure; (5) the time after the cutter or extruding mechanism closes (i.e., after a product is formed) before the weight is measured; (6) the time that the cutter or extruding mechanism remains open; (7) the percentage to adjust the pressure by; (8) the amount of idle time before a screen saver is activated; (9) a password; and (10) the enablement of blowout detection. For example, if the minimum number of cycles before a pressure adjustment ("Startup Cycles") is set at two, the system will not make any pressure adjustments until at least the third extrusion.

Once the number of cylcles is greater than the "Startup Cycles", the operation of each cycle proceeds as follows (Note: Blowout detection is disabled in this description):

a. The extruder apparatus receives a signal from the cam switch.

b. The cylinder output is turned on for a specific time. Cylinder output is the dwell time (time that the cylinder in the extruding mechanism is open) to allow for discharge of the dough. For example, the initialization cylinder output time is a longer duration (e.g., 3.0 seconds) than the operational cylinder output time (e.g., 0.75 seconds) to allow any accumulated "older" dough to be discharged before beginning a cycle with a "new" dough.

c. When the cylinder output turns off, the extruder apparatus waits for a specific number of seconds before measuring the extruder tank weight. This delay is used for stabilization. The chosen wait time must be less than the period of time between each cam switch activation. Failure to do this will result in missed extrusions.

d. The gross weight of the extruder tank is then captured. Data relating to the gross weight of the extruder tank are transmitted from the load cells to the computer. The dispensed weight is calculated (i.e., by subtracting the current gross weight of the extruder tank from previous gross weight of the extruder tank) and divided by the number of actual extruding mechanisms (i.e., does not include extruding mechanisms blocked by baffles) resulting in the actual dispensed weight per dough-based product. The pressure of the tank for the extrusion is also stored.

e. Data from the last extrusion (e.g., the dispensed weight and the tank pressure) and data associated with the current product formula (e.g., target weight, initial tank pressure and feedback adjustment) are used by the computer to determine the pressure for the next extrusion. The computer determines the new pressure using the following formula:

$$\text{New Press} = \text{Last Press} - \left(\frac{ActualWt - TargetWt}{TargetWt}\right)(\text{Last Press})(FeedbackAdjustment)$$

The actual weight (ActualWt) is the measured or dispensed weight of the extruded dough-based products. The target weight (TargetWt) refers to the desired weight of the dough-based products that is also stored in a database. The last pressure (LastPress) is the pressure in the tank for the extrusion that formed the dough-based products having the actual weight. The feedback adjustment ("Feedback Adjustment") is a specified parameter that correlates the difference in weight to the pressure adjustment.

f. If the actual or measured weight of the extruded dough-based products is the same as the target or desired weight (i.e., ActualWt−TargetWt=0), then the pressure is not adjusted. The extruder apparatus then records the cycle number, waits for another signal from the cam, and returns to Step a.

g. If the actual or measured weight of the extruded dough-based products is greater than the target or desired weight (i.e., Actual Wt−TargetWt>0), then the pressure is decreased. If the actual or measured weight of the extruded dough-based products are less than the target or desired weight (i.e., Actual Wt−TargetWt<0), then the pressure is increased.

h. If the computer determines that a pressure adjustment is necessary (i.e., ActualWt≠TargetWt), then it transmits a signal to an air pressure controller coupled to a source of air pressure. If the tank pressure is to be increased, the air pressure controller allows additional air into the extruder tank. If the tank pressure is to be decreased, then the air pressure controller will release air from the extruder tank.

i. The extruder apparatus then records the cycle number, waits for another signal from the cam, and returns to Step a.

The above steps are repeated until the operator presses "STOP." Subsequent signals from the cam are ignored. The operator then presses the "DONE" key to de-pressurize the extruder tank and return to the MAIN MENU.

Various embodiments of the invention have been described in fulfillment of the various objects of the invention. It should be recognized that these embodiments are merely illustrative of the principles of the present invention. Numerous modifications and adaptations thereof will be apparent to those skilled in the art without departing from the spirit and scope of the present invention.

The invention claimed is:

1. A method for automatically forming dough-based products, comprising:

adding dough to a tank comprising a lid;

securing the lid to the tank;

pressurizing the tank containing dough;

extruding the dough into at least one dough-based product;

determining weight data, wherein determining weight data comprises measuring the weight of the at least one dough-based product;

comparing the weight data of the at least one dough-based product to a predetermined weight stored in a computer memory; and adjusting the pressure in the tank based on the weight comparison.

2. The method of claim 1, further comprising specifying at least one process parameter using an input device connected to the computer.

3. The method of claim 2, wherein the dough-based products are extruded onto trays and wherein each extrusion places at least one dough-based product onto a tray.

4. The method of claim 3, wherein a first process parameter is a number of trays to skip after each extrusion.

5. The method of claim 1, further comprising entering a user identification means in a computer.

6. The method of claim 5, further comprising displaying the user identification means.

7. The method of claim 5, further comprising storing data relating to the measured weight of the dough-based products, the pressure adjustment, and the user identification means.

8. The method of claim 5, further comprising selecting a dough-based product formula from a database.

9. The method of claim 1, wherein securing the lid to the tank comprises manually securing the lid to the tank.

10. The method of claim 1, wherein securing the lid to the tank comprises securing the lid to the tank using an automated tank tightener.

11. The method of claim 1, wherein the dough-based products are doughnuts.

12. The method of claim 11, wherein the doughnuts are selected from the group consisting of ring-shaped doughnuts, doughnut shells, doughnut twists and cinnamon rolls.

13. The method of claim 1, further comprising proofing the at least one dough-based product and frying the at least one dough-based product.

14. The method of claim 13, further comprising glazing the dough-based products.

15. An apparatus for automatically forming dough-based products, comprising:

an extruder tank comprising a lid and an air inlet, and containing dough;

means for securing the lid to the extruder tank;

a source of air pressure coupled to the air inlet;

a computer;

at least one load cell in communication with the extruder tank and the computer;

an air pressure controller in communication with the computer and the source of air pressure; and at least one extruding mechanism for extruding at least one dough-based product.

16. The apparatus of claim 15, wherein the means for securing the lid to the extruder tank comprises an automated lid tightener.

17. The apparatus of claim 15, wherein the air pressure controller comprises a transducer.

18. The apparatus of claim 15, further comprising a thermometer.

19. The apparatus of claim 18, wherein the thermometer measures a dough temperature.

20. The apparatus of claim 15, wherein the computer comprises a processor and memory.

21. The apparatus of claim 20, wherein the memory comprises data relating to a default setting.

22. The apparatus of claim 21, wherein the default setting comprises data relating to global parameters and data relating to product formulas.

23. The apparatus of claim 22, wherein the memory comprises a program to restore the default setting.

24. An apparatus for extruding, comprising:

an extruder tank for containing dough comprising a lid and an air inlet;

means for securing the lid to the extruder tank;

a source of air pressure coupled to the air inlet;

a computer;

at least one load cell in communication with the extruder tank and the computer;

an air pressure controller in communication with the computer and the source of air pressure; and at least one extruding mechanism in communication with the extruder tank.

25. The apparatus of claim 24, wherein the means for securing the lid to the extruder tank comprises an automated lid tightener.

26. The apparatus of claim 24, wherein the air pressure controller comprises a transducer.

27. The apparatus of claim 24, further comprising a thermometer.

28. The apparatus of claim 27, wherein the thermometer measures a dough temperature.

29. The apparatus of claim 24, wherein the computer comprises a processor and memory.

30. The apparatus of claim 29, wherein the memory comprises data relating to a default setting.

31. The apparatus of claim 30, wherein the default setting comprises data relating to global parameters and data relating to product formulas.

32. The apparatus of claim 31, wherein the memory comprises a program to restore the default setting.

* * * * *

UNITED STATES PATENT AND TRADEMARK OFFICE

CERTIFICATE OF CORRECTION

PATENT NO. : 7,029,715 B2
APPLICATION NO. : 10/351820
DATED : April 18, 2006
INVENTOR(S) : McCall et al.

It is certified that error appears in the above-identified patent and that said Letters Patent is hereby corrected as shown below:

On title page Item (56) Line 1 under References Cited reading "3,499,395" should read, "3,499,396"

In Column 18, Line 21, that portion reading "3135" should read, "135"

In Column 19, Line 39, that portion reading "cycles" should read, "cycles"

Signed and Sealed this

Eighth Day of August, 2006

JON W. DUDAS
*Director of the United States Patent and Trademark Office*